Aug. 2, 1960
R. H. WENTORF, JR
2,947,034
HIGH PRESSURE HIGH TEMPERATURE APPARATUS
Filed Nov. 27, 1959
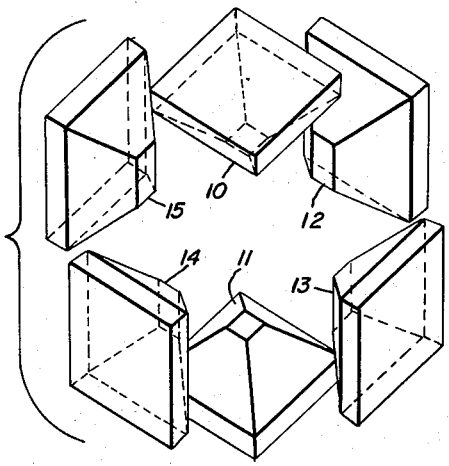
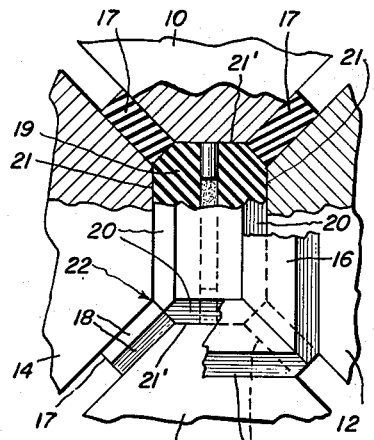
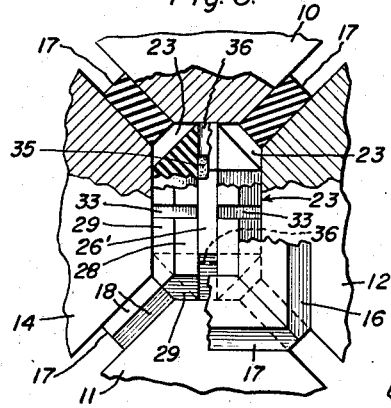
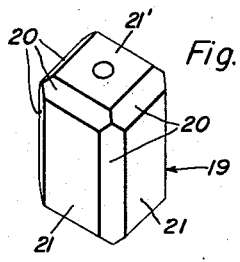
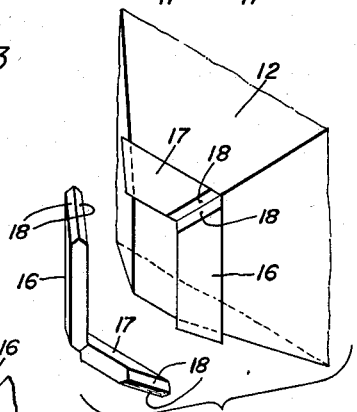
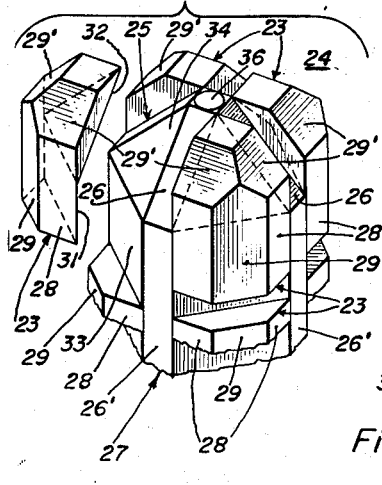
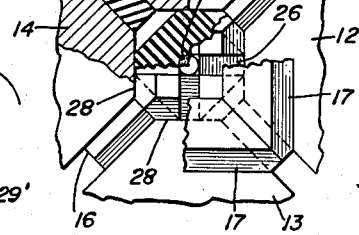
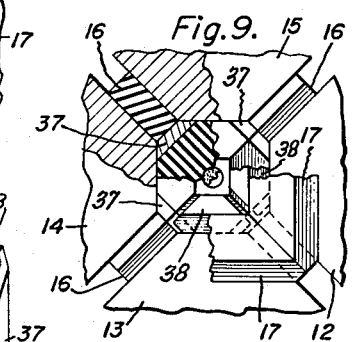
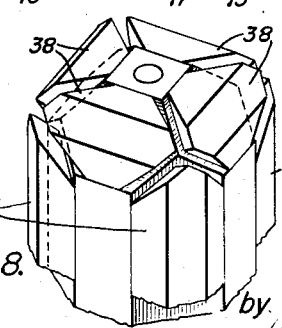
Inventor:
Robert H. Wentorf;
by James J. Lickiello
His Attorney

United States Patent Office 2,947,034
Patented Aug. 2, 1960

2,947,034

HIGH PRESSURE HIGH TEMPERATURE APPARATUS

Robert H. Wentorf, Jr., Schenectady, N.Y., assignor to General Electric Company, a corporation of New York Filed Nov. 27, 1959, Ser. No. 855,866

8 Claims. (Cl. 18—34)

This invention relates to a high pressure high temperature apparatus capable of sustaining a combination of very high pressures and temperatures upon a given reaction vessel or specimen over extended periods of time.

One form of a punch and die assembly or high pressure apparatus which will sustain high pressures and temperatures is generally referred to as the "belt" and is described and claimed in copending application S. N. 707,432, H. Tracy Hall, filed January 6, 1958, and assigned to the same assignee as the present invention. The teachings of that application with respect to design of high pressure high temperature apparatus are incorporated by reference herewith. One of the more important features of the belt apparatus in one form is the use of a tapered punch or pressure resisting member, for example, frusto-conical moving into a tapered or frusto-conical opening in a further pressure resisting member or die. A stone-like gasket between and engaging the tapered portion of the punch and the die not only permits motion of the punch into the die through compressibility of the gasket material, but also supplies lateral support for the punches.

Further progress in the field of high pressure and high temperature apparatus has indicated the desirability of increasing the pressure range of such an apparatus and also the physical size of the reaction vessel or chamber. However, a mere increase in size of the "belt" poses difficult problems, for example, in the manufacture of large pieces of cemented tungsten carbide, and the fact that many failures may occur in the center of the die assembly notwithstanding the diameter thereof. Furthermore, together with the larger sizes, the compression of specimen materials is less isotropic and the internal friction created by the motion of the punch and die is extremely high. Because of unequal loading and difficulties of supporting both punch and die, pressures greatly in excess of, for example, 150,000 atmospheres have yet to be attained by the belt apparatus. The combination of these and other problems together with punch and die failures as described have prevented higher pressures from being attained.

In copending application S. N. 855,867, Bundy, filed November 27, 1959, and assigned to the same assignee as the present invention, there is described and claimed a multiple punch apparatus. In such a multiple punch apparatus, a plurality of punches or pressure resisting members generally move toward each other to compress a specimen material in a chamber. "Pressure resisting members" is a term deemed generic to punches, pistons, dies, etc. One example of the multiple punch type apparatus includes a pair of trapezoidal punches arranged to move vertically towards each other while at the same time four horizontal trapezoidal punches spaced 90° apart and concentric with the vertical punches also move towards each other. The faces of these punches then define a reaction chamber in which a specimen material is placed to be subjected to high pressures and high temperatures. Gaskets are positioned between all surfaces of adjacent punches in order to provide sealing means for the reaction vessel under high pressure conditions and to provide motion of the punches through compressibility. Each of the punches in a multiple punch apparatus, in turn, supports adjacent punches so that all punches are laterally supported and theoretically, an infinite pressure may be generated if the flanks of the punches are properly supported. The aforementioned copending application S. N. 855,867, Bundy, is incorporated by reference herein.

In the Bundy application as well as in the belt, the problem of gasket control exists. The gaskets must undergo considerable compression and deformation without losses in shear strength, be capable of gripping the surfaces of adjacent punches, and also provide substantial hydrostatic pressure support to the punch flanks, ranging from the highest at the innermost edge to a minimum stress at the outermost edge. Gasket control is the control of compression and flow of the gasket so that there is a proper division of punch force and motion with respect to compressing the gaskets for sealing purposes and compressing the sample for high pressures. If a proportionately large punch force is utilized to compress the gaskets, only limited force remains to raise pressure in the sample. By the same token, however, the gaskets must be, during pressure buildup, continually compressed to a degree sufficient to prevent blowout or extrusion and also to a degree which is sufficient to obtain the characteristic advantages of such a gasket as described. It is, therefore, understandable that if means were aavilable to provide compression of the sample to a given stage, for example, 25,000 atmospheres, before any substantial compression of the gaskets, that greatly increased pressures may be obtained, because less force would be required to compress the gaskets and more would be available to compress the sample. This must be done, however, without gasket failure due to lack of gasket compression. Heretofore, gasket compression has been necessary to prevent failure of the gasket in gripping the surfaces of the punch.

Accordingly, it is an object of this invention to provide an improved gasket structure.

It is another object of this invention to provide means to control gasket compression.

It is a further object of this invention to provide a gasket assembly which permits initial pressure buildup with minimum gasket compression.

It is another object of this invention to employ dams across the spaces between punches for initial sealing purposes.

It is still another object of this invention to provide a gasket assembly utilizing relatively incompressible parts to extend the pressure range of high pressure apparatus.

Briefly described, this invention in one form is applied to those high pressure apparatuses where adjacent pressure resisting members such as a punch and a die or multiple punches utilize gaskets therebetween to permit relative motion so that a sample may be compressed by the punch. Therefore, at the innermost juncture between the punch and die, or between adjacent punches, where the sample may extrude together with the gasket, a dam or bridge is positioned to contain the sample so that the sample may be partly compressed without extrusion while at the same time there occurs minimum compression of the gaskets.

This invention will be better understood when taken in connection with the following description and the drawing in which:

Fig. 1 is a schematic representation of a multiple punch high pressure apparatus, Fig. 2 is a partial schematic view of one punch of a multiple punch apparatus with its associated gaskets, Fig. 3 is one form of a reaction vessel for a multiple punch high pressure apparatus, Fig. 4 is a partial cross sectional elevation of the reaction vessel of Fig. 3 positioned in a multiple punch apparatus, Fig. 5 is a three dimensional partial view of a modified reaction vessel, modified to permit positioning thereon a preferred form of a set of dams in accordance with the teachings of this invention, Fig. 6 is a partial cross sectional elevation of the reaction vessel of Fig. 5 positioned in a multiple punch apparatus, Fig. 7 is a top plan view of the assembly of Fig. 6 partly in section, Fig. 8 is a partial three dimensional view of another modified reaction vessel with a modified dam structure, and Fig. 9 is a top plan view partly in section of the assembly of Fig. 8 positioned in a multiple punch apparatus.

Referring now to Fig. 1, it is obvious that together with an upper and lower punch 10 and 11, and a plurality of horizontal punches 12, 13, 14 and 15, a reaction chamber or volume is defined. While the punches are shown in this invention to be of a trapezoidal configuration to, in turn, define a cubical or rectangular parallelepiped reaction chamber, it is obvious that various configurations of reaction chamber may be defined depending upon the configuration of the end faces of all punches. It is also understood that a plurality of gaskets (as more clearly shown in Figs. 2, 4, and 6) are also provided between all punches. Movement of these punches towards each other compress the gaskets and also apply compression to a specimen in the defined chamber. The word "compression" is indicative of compression only or compression with resultant shearing forces in the gaskets.

In prior operation of this type of apparatus, it has been found that while only a minimum stroke or movement of the punches is necessary to provide high pressure conditions in the sample that also a very high proportion of the available stroke is utilized primarily to compress the gaskets, so that after gasket compression, the remaining available stroke to compress a specimen material is severely limited. In other words, it is found that the gaskets are compressed too much and the specimen is compressed too little. This effect limits the pressure which can be reached in a multiple punch apparatus and renders proper application of a load difficult since the gaskets may blow out or otherwise fail or the punches may be damaged before sufficient chamber pressure is obtained. The gaskets may also attempt to extrude before final pressure is reached. Therefore, control of gasket compression and flow is the key to achieving high pressures in a multiple punch apparatus, i.e., to 300,000 to 1 million atmospheres. It has been discovered that a solution to gasket problem entails adding certain parts in the critical region of the reaction chamber between the reaction vessel and the punches.

In Fig. 2, for the purpose of explanation, there is schematically illustrated one of the punches of Fig. 1, punch 12, for example. Each punch has assembled thereon a gasket assembly comprising a pair of side gaskets 16 and top and bottom gaskets 17. Bevel surfaces 18 are provided at the ends of all gaskets to define a closed volume in the multiple punch apparatus, as illustrated in Fig. 4, wherein a suitable reaction vessel 19 is positioned. One such reaction vessel is illustrated in Fig. 3.

Referring to Fig. 3, the reaction vessel 19 is in the general form of a rectangular parallelepiped having narrow plane edges 20 together with the lateral surfaces 21 and top and bottom surfaces 21'. Such a reaction vessel is placed between the punches of a multiple punch apparatus as shown in Fig. 1. The assembly, however, is more clearly described with respect to Fig. 4.

Fig. 4 illustrates the general outline of the reaction vessel 19 of Fig. 3 in a punch apparatus. In Fig. 4, the punches 10, 11, 12 and 14 with punches 13 and 15 (not shown) push on reaction vessel 19 with the punches pushing directly against the larger side and top surfaces 21 and 21' of the vessel 19. Motion of the punches is provided by means of the compressible gaskets as illustrated in Fig. 2, between all punches.

In order to obtain the desired feature of providing a first stage of, or initial compression, in the reaction vessel, means must be provided to overcome failures of the gasket assembly in the critical areas. These critical areas are those areas in the gaskets between the punches, for example, juncture 22 in Fig. 4. In order to prevent gasket or reaction vessel extrusion or failure at these junctures, the reaction vessel of Fig. 3 is modified to permit the addition of dam members 23 as illustrated in Fig. 5.

In Fig. 5, eight dam members are positioned on a reaction vessel 24 which includes a top (bottom section not shown) section 25 in a general pyramid form with beveled edges 26. The center section 27 is of rectangular parallelepiped configuration with beveled edges 26' which are continuations of beveled edges 26. Each dam includes side surfaces 28 which together with side surfaces 28 of adjacent dams and the side surface 26' of the reaction vessel, provide the major surfaces against which the punches push. The additional surfaces 29 and 29' provide the exterior plane such as planes 20 as in the reaction vessel 19 of Fig. 3. Each dam also includes a pair of interior surfaces 31 and 32 which are a rectangular plane and a triangular plane, respectively. These surfaces are complementary to and lie contiguous with surfaces 33 and 34, respectively, on the reaction vessel. In this manner, eight dams are positioned on each reaction vessel with the overall configuration illustrated in Fig. 5. It is to be noted in Fig. 5, that the final assembly provides a gap or spacing between each dam. Such a spacing is necessary in order to provide compression of the vessel. In practice, it has been found that about 1/16 of an inch is a satisfactory spacing for a reaction vessel about 1/2 inch on edge. In the final assembly, further gaskets may be placed between the dam members and the assembly maintained as a unit by joining or attaching all parts, for example, by cementing. The assembly is then positioned in the reaction chamber of a multiple punch apparatus as illustrated in Fig. 6.

In Fig. 6, the assembly of Fig. 5 is illustrated in a partial and sectional side view. The specimen material 35 to be compressed is positioned within a central bore of the reaction vessel and maintained therein by suitable plugs 36. Where resistance heating of the specimen is employed, the plugs are electrically conductive and the specimen is either made electrically conductive or suitable heaters are used. Electrical current may then flow from punch 10 through specimen 35 and out punch 11. As described, the horizontal punches push on surfaces 28 of the dams and the vertical punches push on surfaces 34 of the dams while at the same time compressing gaskets 16 and 17. Fig. 6 illustrates the dams acting as dams or bridging members across the critical areas between punches, while the gap therebetween also permits compression of the reaction vessel.

Referring to Fig. 7, it is more clearly illustrated how side punches 12, 13, 14 and 15 push on the surfaces 28 of the dams. The dams also act as a bridge across the gaps between side punches with flat faces adjacent and slidable across the flat faces of adjacent punches. All junctures are, therefore, spanned by these dam members.

These dams provide two included advantages. The dams extend the range of the gasket structure by providing for substitution of gasket materials and preventing extrusion thereof when the gaskets are only lightly loaded. The gaskets may be made of a thinner design or a more compressible material so that when the punches, move to compress the reaction vessel, the dams act as the sealing means to prevent reaction vessel extrusion and to permit the generation of, for example, about 25,000 atmosphere pressure within the reaction vessel before the gaskets begin to hold firmly. With 25,000 atmospheres of pressure already within the reaction vessel, and substantially before any degree of compression has taken place in the gasket structure, it is evident that the range of pressure in the reaction vessel may be greatly extended without being so severely limited by the compressibility of the gasket structure. It is obvious that the dam members may be metal, non-metal, or combinations thereof. Hard steel has been employed with good results.

A modification of the dam structure of this invention is illustrated in Fig. 8. In Fig. 8, suitable dam members 37 are provided along the four longer edges of the reaction vessel, while shorter dam members 38 are provided at the top and bottom edges. These dam members are of metal and of a cross section equivalent to the frustum of a pyramid. Gaps are provided between adjacent dam members to permit compression of the reaction vessel. The configuration as shown in Fig. 8 is then placed within a multiple punch apparatus similar to that in Figs. 1 and 4. A top partial sectional view of this assembly is shown in Fig. 9. In Fig. 9, punches 12, 13, 14 and 15 push on the sides of the reaction vessel and at the same time on the dam members 37. Initial compression of the reaction vessel is accomplished by means of the provided gaps between dams, and compression of the punch gasket structure follows. Only minor modifications or changes are necessary in various reaction vessel configurations to accommodate the dams. A comparison of Figs. 2, 5 and 8 illustrates that the various modifications operate in the same manner.

In all instances, it is obvious that gaskets or some sealing means may also be employed between adjacent surfaces or described gaps of the dam members themselves. A gasket between adjacent dam members is only one method of sealing if desirable. Many methods exist which would be equally satisfactory. For example, the dams could have interleaving or tongue and groove joints or various other slip connections well known in the art, to provide a constant seal. It has been found that in the operation of a multiple punch apparatus which includes floating dams, pressures in the order of 25,000 atmospheres may be generated in a reaction vessel before any of the gasket structure need be substantially compressed and that thereafter nearly full compressibility of the gasket results in a large stroke for higher compression. In other words, these dams prevent leakage of the reaction chamber contents and/or gasket failure during initial compression of the sample to about 25,000 atmospheres without it being necessary to call upon the gaskets for sealing or for piston lateral support. At 25,000 atmospheres most substances are substantially compacted, so that they compress relatively little more upon a further increase of pressure to about 100,000 to 300,000 atmospheres. As the sample in the chamber compresses further, the gaskets along the piston flanges can be initially compressed to provide the necessary seal and lateral support for pressures above 25,000 atmospheres. Because the floating dams provide a significant amount of the pressure seal at high pressures, the gaskets may be designed so that they produce the proper lateral support pressure distribution on the pistons by compression of the gaskets without the complication of gasket extrusion which would tend to occur without dams. The actual design construction of the entire apparatus is then, therefore, considerably simplified because extrusion of a gasket at high pressures is a complicated phenomenon which is difficult to study compared to compression alone. The sliding surfaces between the dams and between the dams and the punches are conveniently lubricated by a thin film of some material such as $MoS_2$, Teflon, mica, AgCl, etc., although care must be taken in order that the lubricant film does not contaminate the gaskets proper, unless this is desired. The surface stresses placed upon the punch tips by the floating dams are suitable for additional support to the piston. These stresses would not amount to more than 5% of the total tip pressure with lubricants now available.

It can thus be seen that the objects of this invention are attained by the use of floating dams in a pressure resisting member apparatus of the multiple punch, punch and die, or combination types where the dams provide sealing means between the junctures of the members, to provide in turn, initial compression to a high degree before actual compression of gaskets takes place. It is obvious that such dams may be employed for various reaction vessel configurations starting, in planar surface vessels, with the tetrahedron or 4-sided figure and including not only configurations of additional planar surfaces, but also arcuate surface vessels and combinations of arcuate and planar surfaces.

While a specific apparatus in accordance with this invention has been illustrated and described, it is not desired that the invention be limited to the particular description or to the particular configurations illustrated and it is intended by the appended claims to cover all modifications within the spirit and scope of this invention.

What I claim as new and desire to secure by Letters Patent of the United States is:

1. In a high pressure apparatus having a plurality of pressure resisting members, said pressure resisting members defining a reaction chamber in which a specimen material is placed to be subjected to high pressure, said pressure resisting members defining a gap therebetween, and a gasket in said gap next adjacent said reaction chamber and between said pressure resisting members, said gasket providing relative motion between said pressure resisting members through compression thereof, the improvement comprising, a floating dam member, bridging the gap from one said pressure resisting member to another pressure resisting member between said gasket and said reaction chamber.

2. The invention as claimed in claim 1 wherein a plurality of gaps are defined and a dam is employed at each gap.

3. In a multiple punch apparatus wherein a plurality of punches define a reaction chamber in which a specimen material is placed to be subjected to high pressures and where a gasket is positioned between adjacent punches to seal said chamber and to permit relative motion of said punches, the improvement comprising, a dam member bridging the gap between said punches and positioned between said gaskets and said reaction chamber and lying in sliding relationship to the interior surfaces of the chamber.

4. In a multiple punch apparatus wherein the punch faces define a reaction chamber and move towards and compress a reaction vessel in said chamber and where relative motion of the punches is provided by means of compression in gaskets in the gaps between the punches, the improvement comprising a floating dam member bridging the gap defined by at least 2 punches and adapted to slide against the faces of the said 2 punches, said dam positioned between the said reaction vessel and the said gaskets.

5. In a multiple punch apparatus wherein the punch faces define a reaction chamber and move towards and compress a reaction vessel in said chamber and where relative motion of the punches is provided by means of compression in gaskets in the gaps between the punches, the improvement comprising a floating dam member bridging the juncture defined by at least 3 punches and adapted to slide against the faces of the said 3 punches, said dam positioned between the said reaction vessel and the said gaskets.

6. In a multiple punch apparatus having a plurality of adjacent trapezoidal punches whose faces define an angular reaction chamber wherein an angular reaction vessel is placed to be subjected to high pressures, and where motion of said punches is permitted by means of compression in gaskets in gaps therebetween and where an edge of said reaction vessel lies next adjacent a gap and a gasket, the improvement comprising a dam member bridging the gap between the adjacent punches in sliding relationship to faces of adjacent punches, at least one dam member being positioned to cover a part of each edge of said reaction vessel and positioned between said edge and said gasket adjacent a gap.

7. In a multiple punch apparatus having a plurality of adjacent trapezoidal punches whose faces define a reaction chamber having edges and corners and whose sides lie in adjacent relationship, and where a reaction vessel having edges and corners is placed in complementary relationship in said reaction chamber, and said reaction vessel is compressed together with gaskets between adjacent sides of adjacent punches, the improvement comprising a dam member positioned between said reaction vessel and said punches, said dam member bridging a gap between adjacent punches and covering a corner and a part of an edge of said reaction vessel, said dam members having flat surfaces engaging and slidable on the faces of said punch.

8. In a multiple punch apparatus having 6 trapezoidal punches whose flat faces define a rectangular parallelepiped reaction chamber, a rectangular parallelepiped reaction vessel having beveled edges in said chamber, a gasket between adjacent sides of adjacent punches, the improvement comprising a metal dam member positioned on each beveled edge of said reaction vessel between the said vessel and the gasket between adjacent punches, said dam member having a flat surface adjacent a beveled edge of said reaction vessel, and complementary flat surfaces adapted to slide against the flat faces of adjacent punches bridging the gap therebetween.

References Cited in the file of this patent
UNITED STATES PATENTS

| | | |
|---|---|---|
| 2,149,596 | Gillett et al. | Mar. 7, 1939 |
| 2,360,528 | Talmage | Oct. 17, 1944 |
| 2,406,361 | Fairbank et al. | Aug. 27, 1946 |
| 2,687,555 | Ansfron et al. | Aug. 31, 1954 |
| 2,815,549 | Olson | Dec. 10, 1957 |
| 2,918,699 | Hall | Dec. 29, 1959 |